United States Patent
Altmann et al.

(10) Patent No.: US 8,231,434 B2
(45) Date of Patent: Jul. 31, 2012

(54) GRINDING MACHINE, PARTICULARLY A HIGH-SPEED GRINDING MACHINE

(75) Inventors: Siegfried Altmann, Petersberg (DE); Juergen Armes, Grossenlueder-Eichenau (DE)

(73) Assignee: REFORM Maschinenfabrik Adolf Rabenseifner GmbH & Co. KG, Fulda (DE)

( * ) Notice: Subject to any disclaimer, the term of this patent is extended or adjusted under 35 U.S.C. 154(b) by 914 days.

(21) Appl. No.: 12/211,652

(22) Filed: Sep. 16, 2008

(65) Prior Publication Data

US 2009/0075571 A1 Mar. 19, 2009

(30) Foreign Application Priority Data

Sep. 17, 2007 (DE) .......................... 10 2007 044 275

(51) Int. Cl.
  *B24B 7/00* (2006.01)
(52) U.S. Cl. ............................ 451/66; 451/195; 451/262
(58) Field of Classification Search .................. 451/65, 451/66, 195, 262; 483/30, 33
See application file for complete search history.

(56) References Cited

U.S. PATENT DOCUMENTS

| | | | |
|---|---|---|---|
| 4,780,951 A | | 11/1988 | Beyer et al. |
| 4,996,762 A | * | 3/1991 | Takayama ...................... 483/49 |
| 5,220,749 A | * | 6/1993 | Youden et al. .................. 451/65 |
| 5,245,792 A | | 9/1993 | Liechti et al. |
| 6,454,636 B1 | * | 9/2002 | Iwabuchi ........................ 451/53 |
| 6,666,748 B2 | * | 12/2003 | Hiramoto et al. ................. 451/5 |
| 7,125,312 B2 | | 10/2006 | Castanares et al. |
| 2002/0028628 A1 | * | 3/2002 | Hiramoto et al. ................. 451/5 |
| 2004/0038787 A1 | * | 2/2004 | Watanabe ...................... 483/12 |

FOREIGN PATENT DOCUMENTS

| | | |
|---|---|---|
| DE | 32 46 168 C2 | 7/1983 |
| DE | 36 20 047 A1 | 1/1987 |
| DE | 85 18 963.4 U1 | 3/1987 |
| DE | 195 38 663 A1 | 4/1996 |
| EP | 0 483 064 A1 | 4/1992 |
| EP | 1 000 702 A2 | 5/2000 |
| EP | 1 491 289 A1 | 12/2004 |

OTHER PUBLICATIONS

European Search Report dated Jan. 30, 2009 with English translation (eight (8) pages).
German Search Report dated Mar. 4, 2008 with English translation (Eight (8) pages).

* cited by examiner

*Primary Examiner* — Timothy V Eley
(74) *Attorney, Agent, or Firm* — Crowell & Moring LLP

(57) ABSTRACT

In order to be able to economically carry out machining of a turbine rotor having blades consisting of different materials, by a high-speed grinding machine, a magazine for the grinding wheels and an automatically operating grinding wheel changer are provided. A plurality of different grinding wheels to be held are made available, which different grinding wheels are adapted to the respective blade materials. A flat-construction coupling is developed in order to be able to couple the grinding wheels with the receiving devices in the grinding wheel changer.

8 Claims, 3 Drawing Sheets

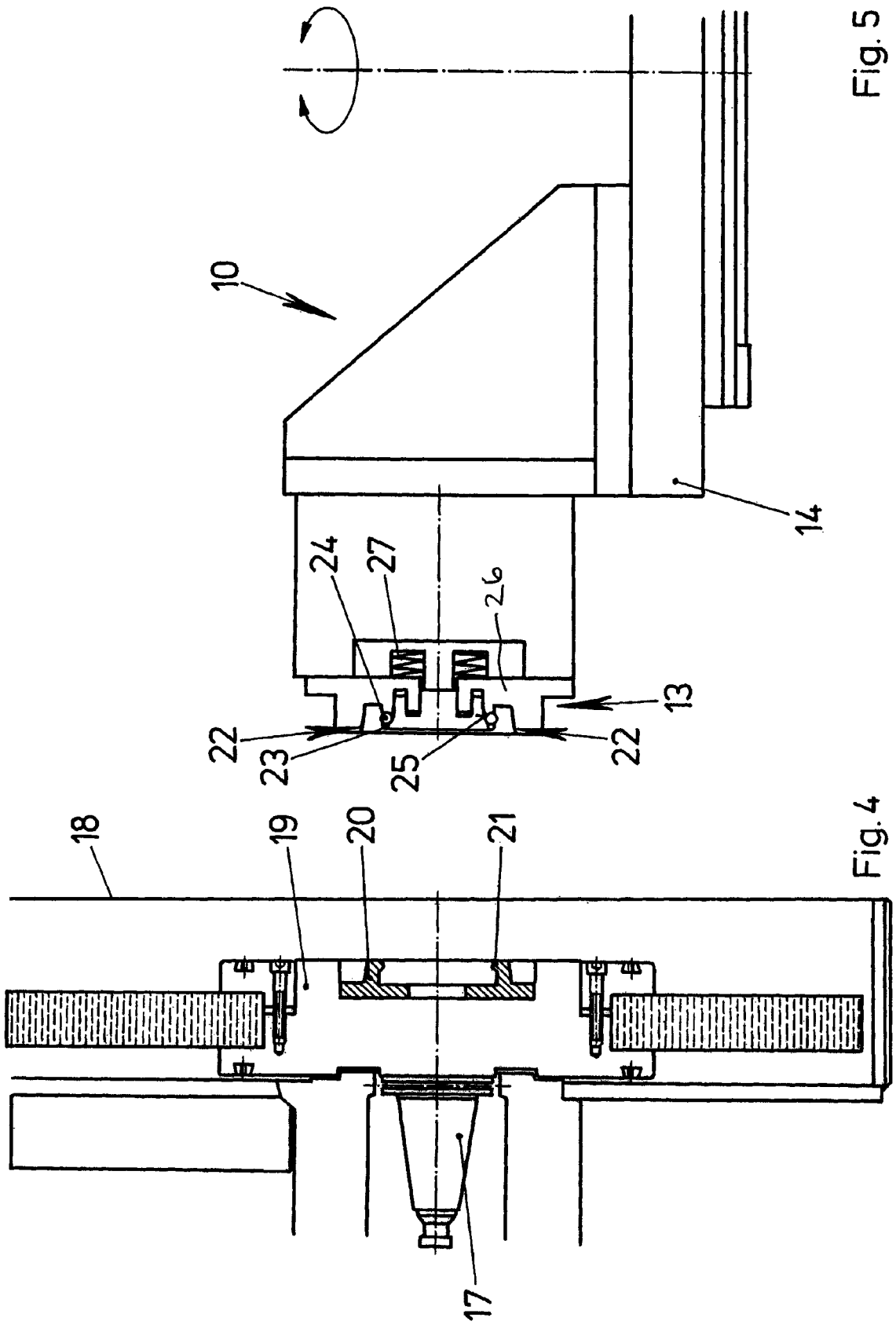

GRINDING MACHINE, PARTICULARLY A HIGH-SPEED GRINDING MACHINE

CROSS-REFERENCE TO RELATED APPLICATIONS

This application claims the priority of German Application No. 10 2007 044 275.2, filed Sep. 17, 2007, the disclosure of which is expressly incorporated by reference herein.

BACKGROUND AND SUMMARY OF THE INVENTION

The invention relates to a grinding machine, particularly a high-speed grinding machine, having a bench on which bearing brackets for a turbine rotor consisting of several stages and a grinding wheel head are arranged, rotatably about its axis, the turbine rotor being disposed in the bearing brackets and, rotatably about a spindle axis extending parallel to the rotor axis, at least one grinding wheel being disposed in a receiving device at the grinding wheel head. The grinding wheel head and the bearing brackets are adjustable with respect to one another in the axial direction of the bench, which is determined by the rotor axis, so that the blades of the successive phases of the turbine rotor can be ground successively.

Such a high-speed grinding machine is described in European patent document EP 1 491 289. In order to be able to work different types of phases, this machine has a grinding wheel head, which can be rotated by 180°, and has two grinding wheels arranged on opposite sides of the head. This is done so that, depending on the position of the grinding wheel head, in each case, one of the grinding wheels machines one phase of the turbine rotor. In this manner, rotors can be machined for which blades of two different materials are used, the grinding wheels, with respect to their composition, being adapted to the respective blade material to be machined. In order to be able to adapt the rotor still better to the different thermal stresses in the turbines, depending to which stage of the rotor the blades are assigned, the latter are also manufactured of more than two different materials or alloys so that, depending on the number of materials used, for finishing the rotor, a correspondingly increased number of grinding wheels are required which are adapted to the respective material. In order to implement the latter, it might be considered to increase the number of grinding wheels at the grinding wheel head so that all grinding wheels necessary for grinding the turbine rotor will be available at the grinding wheel head. However, this would have the disadvantage of further increasing its weight, so that the constructive expenditures that exist even in the case of a two-grinding-wheel head would have to be increased even more in order to be able to position the grinding wheel head with the high precision required for an exact grinding.

The invention is therefore based on the problem of creating a high-speed grinding machine that is capable of automatically machining a turbine by use of more than one grinding wheel in a highly precise manner.

For solving this problem, the invention provides a magazine for grinding wheels and an automatically operating grinding wheel changer.

In this case, the grinding wheel head has only one or, as required, several receiving devices for grinding wheels so that its weight is as low as possible, and it can be guided in a highly precise manner while its constructive expenditures are still low. The number of receiving devices is definitely lower than the number of grinding wheels required for the rotor machining. Depending on the requirements, the grinding wheels are therefore exchanged by use of the grinding wheel changer. Since the latter operates automatically, the grinding operation for all stages of the rotor can be programmed by use of a corresponding control.

One or more receiving devices for grinding wheels are therefore situated at the grinding wheel head, which receiving devices are equipped with grinding wheels from a magazine, as required, while exchanging the grinding wheels present at the grinding wheel head.

The grinding wheel changer is preferably arranged on a linear carriage, which can be moved in the axial direction. The guiding of the linear carriage takes place parallel to the bench, so that a short path can be implemented between the grinding wheel head and the magazine.

In order to be able to optimize the changing operation with respect to time, the grinding wheel changer has two or more, but preferably two, receiving devices. The receiving devices are arranged in a distributed manner or mutually opposite on a platform which, rotatably about a vertical axis, is held on the carriage. As a result, one receiving device can accommodate a grinding wheel from the magazine and the other receiving device can accommodate a grinding wheel from the grinding wheel head. The grinding wheel on the grinding wheel head is replaced by the grinding wheel from the magazine, before this grinding wheel itself is deposited in the magazine.

The magazine is preferably arranged on the face of the bench and, in a rotatable carrier, has several receiving devices for the grinding wheels, which are arranged in a plane oriented vertically and perpendicularly with respect to the axial direction. This arrangement permits short paths and therefore a change that can be carried out rapidly.

Furthermore, each grinding wheel has a coupling piece of a first type on its one face, which coupling piece interacts with a corresponding counterpart in the receiving devices at the grinding wheel head and the magazine carrier, and a coupling piece of a second type on its other face, which coupling piece interacts with the receiving devices at the grinding wheel changer.

The coupling piece of the first type has a long cone, which permits a precise and centric guidance and footing in the grinding wheel head.

With respect to the coupling of the second type, it should be taken into account that the grinding wheel at the grinding wheel head is largely encapsulated by a protective hood, which permits a sucking-off of the grinding dust. A wall of this protective hood rests closely against the free side of the grinding wheel. For taking into account the limited space conditions, the invention further provides that the coupling piece of the second type consists of a ring which is to be inserted in a face-side indentation of the grinding wheel core, the ring axis being situated in the grinding wheel axis, and the edge of the ring projecting from the face having a collar pointing radially toward the inside.

For this purpose, the counterpart in the receiving device at the grinding wheel changer consists of a ring-type indentation for receiving the ring. Clamping elements are provided at the interior edge of the indentation, which clamping elements can be moved radially toward the outside by way of a movement operation, in order to reach behind the collar on an inserted ring and to thereby close the coupling.

The operating of the clamping elements to place them into a position closing the coupling takes place by way of a tensioning device consisting of springs, and into a position releasing the coupling by way of a hydraulic or pneumatic adjusting device. In this manner, it is ensured that the coupling is mechanically closed and a grinding wheel held by the coupling is not released from the coupling even in the event of a failure of the electric or pneumatic supply of the grinding wheel changer.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 is a cross-sectional view of a grinding wheel; and

FIG. 5 is a cross-sectional view of a grinding wheel receiving device at the grinding wheel changer.

DETAILED DESCRIPTION OF THE DRAWINGS

Figure 1:
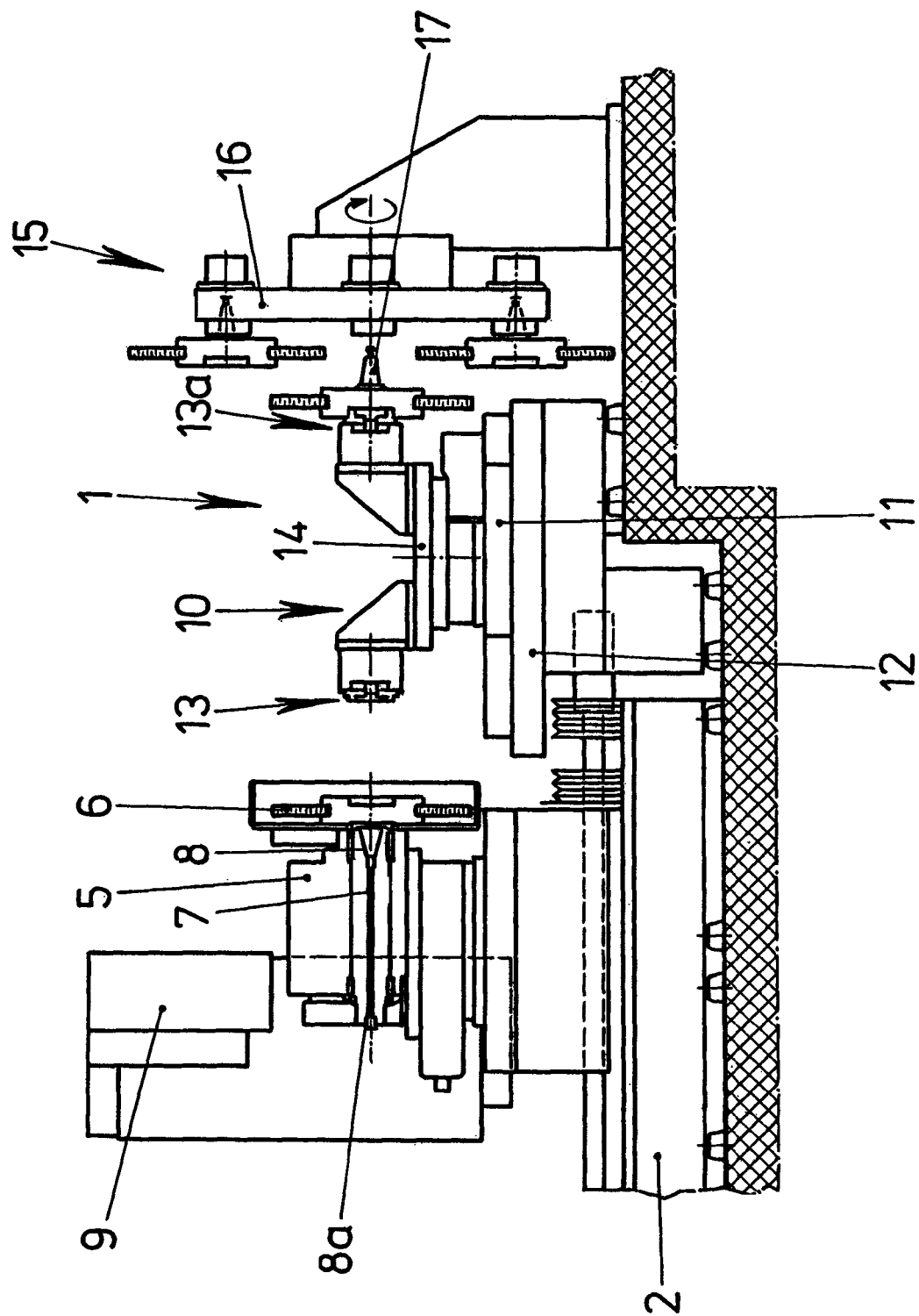
FIG. 1 is a lateral view of a high-speed grinding machine according to the invention.
Figure 2:
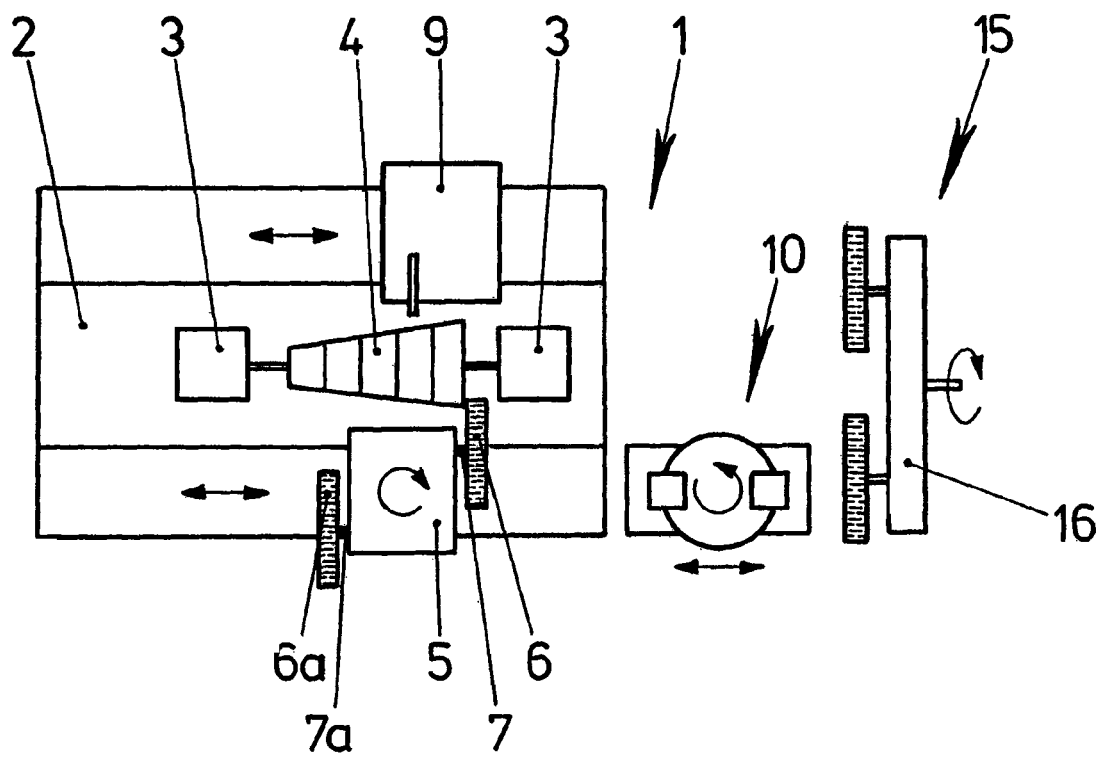
FIG. 2 is a top view of a high-speed grinding machine according to FIG. 1.

First, reference is made to FIGS. 1 and 2. These figures show a high-speed grinding machine 1 having a bench 2, on which the bearing brackets 3 for a turbine rotor 4 consisting of several phases are situated. The turbine rotor 4 is, rotatably about its axis, disposed in the bearing brackets 3. The axis of the turbine rotor 4 determines the longitudinal axis of the grinding machine 1. On one longitudinal side of the turbine rotor 4, a grinding wheel head 5 is disposed, at which two grinding wheels 6, 6a are in each case, rotatably about a spindle axis extending parallel to the rotor axis, disposed in a receiving device 8, 8a. The grinding wheel head 5 can be moved in the axial and radial direction with respect to the bearing brackets 3, so that the blades of the successive stages of the turbine rotor 4 can be ground successively. On the other side of the turbine rotor, a laser measuring device 9 for determining the grinding progress is situated.

A grinding wheel changer 10 is arranged laterally with respect to the axis of the turbine rotor 4 in front of the grinding wheel head 5 on a linear carriage 11, which can be moved on rails 12 in the axial direction. The rails 12 are arranged in an extension for the guiding of the grinding wheel head 5 and parallel with respect to the axis of the turbine rotor 4.

The grinding wheel changer 10 itself consists of two mutually opposite and radially outward-pointing receiving devices 13, 13a, which are arranged on a platform 14 that is, rotatably about a vertical axis, disposed on the linear carriage 11.

Figure 3:
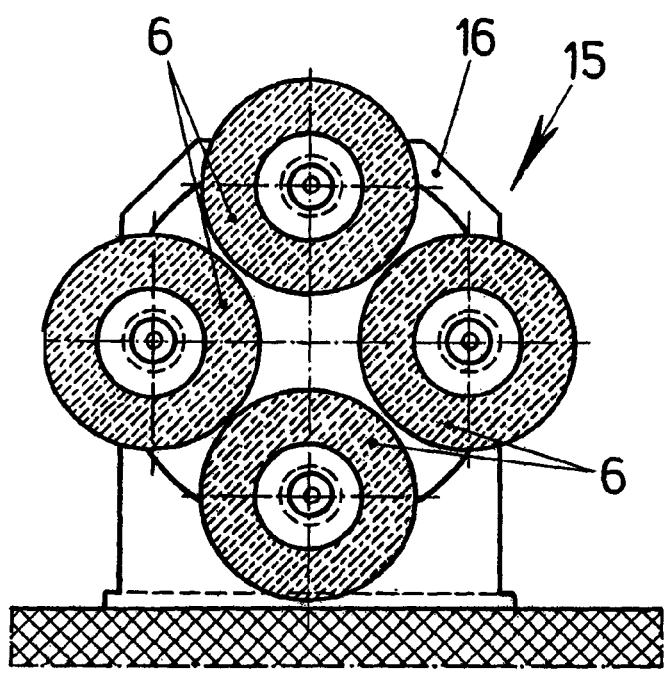
FIG. 3 is a frontal view of a magazine containing four grinding wheels.

A magazine 15 for grinding wheels is arranged on the face of the bench 2. According to FIG. 3, the magazine 15 consists of a magazine carrier 16 for three, four or more grinding wheels, which magazine carrier 16 can be rotated about a horizontal axis. The magazine carrier 16 is, in each case, rotated into a position such that a grinding wheel to be exchanged is situated in front of the grinding wheel changer 10. In that the grinding wheel changer 10 is moved radially in the direction of the magazine carrier 16, one of the receiving devices 13, 13a can be coupled with the grinding wheel. As a result of a rotation of the platform 14 by 180°, the received grinding wheel is moved in front of the receiving device 8 or 8a of the grinding wheel head 5 and can couple with the receiving device 8 or 8a in that the linear carriage 11 is moved axially in the direction of the grinding wheel head 5. Should the platform have more than two receiving devices or the magazine not be situated opposite the grinding wheel head, the angle of rotation of the platform should be correspondingly adapted and may also be more or less than 180°.

According to FIG. 4, each grinding wheel 6 has a coupling piece 17 of a first type on its one face, which interacts with the receiving devices 8, 8a at the grinding wheel head 5 and at the magazine carrier 16. The coupling pieces 17 of the first type are standardized quick-release tapers or hollow-shaft tapers, which are fitted into corresponding conical indentations in the receiving devices 8, 8a at the grinding wheel head 5 and at the magazine carrier 16 and are gripped and held there by a clamp. This type of coupling is known to a person skilled in the art and therefore does not have to be explained in detail.

However, this type of coupling piece is not suitable for coupling with the grinding wheel changer 10 because, as a result of the height of the cones, they project from the surface of the grinding wheels. The grinding wheel head 5 is, however, equipped with a protective hood 18 which, for avoiding suction losses, is arranged relatively closely to the face of the grinding wheel. The distance between the face and the protective hood 18 is at least smaller than the normal height of quick-release tapers or hollow-shaft tapers, as they are used for the connection with the spindle of the grinding wheel head 5.

For coupling with the grinding wheel changer 10, a coupling piece of a second type is therefore used, which consists of a ring 20 to be inserted in a face-side indentation of the grinding wheel core 19. The ring axis is situated in the grinding wheel axis and the edge of the ring 20 projects from the face having a radially inward-pointing collar 21.

FIG. 5 shows the counterpart in the receiving device 13 at the grinding wheel changer 10. The receiving device 13 consists of a ring-type indentation 22 for receiving the ring 20, and clamping elements 24 in the form of balls being provided in a web 23 at the interior edge of the indentation 22. The balls are moved radially toward the outside by way of a ramp 25 at a central operating device 26 in order to reach behind the collar 21 of a ring 20 inserted in the indentation 22 to thereby close the coupling.

By use of a tensioning device 27 consisting of a cup spring assembly, the operating device 26 is held in a position closing the coupling. For releasing the coupling, by way of a hydraulic or pneumatically acting adjusting device (not shown here in detail), the operating device 26 is moved into a position releasing the coupling; that is, the operating device 26 is moved toward the outside, and the ramp 25 releases the clamping elements 24 so that the latter can slide radially to the inside.

In order to be able to insert a grinding wheel 6 in one of the receiving devices 8, 8a, the protective hood 18 has a removable side wall on the side away from the respective receiving device 8, 8a. The side wall is constructed, for example, in the form of a slide. For inserting a grinding wheel 6, the slide is pushed to the side in a motor-driven manner so that the receiving device 8 or 8a is exposed and the grinding wheel can be inserted. As soon as this has occurred and the grinding wheel changer has withdrawn, the slide is pushed back so that the protective hood 18 can be closed again.

TABLE OF REFERENCE NUMBERS

1 High-speed grinding machine
2 bench
3 bearing brackets
4 turbine rotor
5 grinding wheel head
6 grinding wheel
7 spindle axis
8 receiving device
9 laser measuring device 10 grinding wheel changer
11 linear carriage
12 rails
13 receiving devices
14 platform
15 magazine
16 carrier
17 coupling piece
18 protective hood
19 grinding wheel core
20 ring
21 collar
22 indentation
23 web
24 clamping elements
25 ramp
26 operating device
27 tensioning device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A high-speed grinding machine, comprising:
   a bench;
   bearing brackets for a turbine rotor comprising several stages being arranged on the bench, the turbine rotor being rotatably disposed in the bearing brackets about its axis;
   a grinding wheel head arranged on the bench, the grinding wheel head having a receiving device;
   at least one grinding wheel being rotatably disposed in the receiving device about a spindle axis extending parallel to the rotor axis;
   wherein the grinding wheel head and the bearing brackets are adjustable relative to one another in an axial direction of the bench, which direction is determined via the rotor axis, in order to grind successively blades of the several stages of the turbine rotor;
   a magazine containing one or more grinding wheels; and
   an automatically operating grinding wheel changer operatively configured to receive a grinding wheel from the magazine and to arrange the received grinding wheel in the receiving device at the grinding wheel head.

2. The grinding machine according to claim 1, further comprising a linear carriage on which the grinding wheel changer is arranged, the linear carriage being movable in the axial direction.

3. The grinding machine according to claim 2, wherein the grinding wheel changer comprises two or more receiving devices arranged in a distributed manner on a platform disposed on the linear carriage, the platform being rotatable about a vertical axis.

4. The grinding machine according to claim 1, wherein the magazine is operatively arranged on a face of the bench; and
   the magazine comprising a rotatable magazine carrier having several receiving devices for the one or more grinding wheels, said receiving devices being arranged in a plane oriented vertically and perpendicularly with respect to the axial direction.

5. The grinding machine according to claim 1, wherein each of the one or more grinding wheels comprises a first coupling piece on one end face, which first coupling piece interacts with a corresponding counterpart in the receiving device at the grinding wheel head and at a magazine carrier of the magazine; and
   wherein each of the one or more grinding wheels has a second coupling piece of a different type on another end face, which second coupling piece interacts with receiving devices at the grinding wheel changer.

6. The grinding machine according to claim 5, wherein the second coupling piece comprises a ring insertable in a face-side indentation of a grinding wheel core, an axis of the ring being situated in the grinding wheel axis, and an edge of the ring projecting from the face having a radially inward-pointing collar.

7. The grinding machine according to claim 6, wherein the counterpart in the receiving device at the grinding wheel changer comprises a ring-type indentation for receiving the ring, and clamping elements provided at an interior edge of the indentation, said clamping elements being radially movable toward the outside via an operating device in order to reach behind the collar on the inserted ring in order to close a coupling.

8. The grinding machine according to claim 7, wherein the operating device is movable via a spring tensioner into a position closing the coupling, and is movable via one of a hydraulic or pneumatic adjusting device into a position releasing the coupling.

* * * * *